United States Patent [19]
Ward, Jr.

[11] 3,858,068
[45] Dec. 31, 1974

[54] DYNAMOELECTRIC MACHINE HAVING VENTILATING MEANS

[75] Inventor: Howard Christian Ward, Jr., Schenectady, N.Y.

[73] Assignee: General Electric Company, Schenectady, N.Y.

[22] Filed: May 24, 1973

[21] Appl. No.: 363,728

[52] U.S. Cl.................. 310/59, 310/60, 310/64
[51] Int. Cl. ........................................ H02k 9/00
[58] Field of Search .................. 310/58–60, 310/64

[56] References Cited
UNITED STATES PATENTS

| | | | |
|---|---|---|---|
| 2,862,121 | 10/1958 | Ringland | 310/59 X |
| 3,027,470 | 3/1962 | Atherton | 310/59 |
| 3,407,317 | 10/1968 | Honsinger | 310/59 X |
| 3,436,579 | 4/1969 | Gaensbauer et al. | 310/60 X |

*Primary Examiner*—Mark O. Budd
*Attorney, Agent, or Firm*—Vale P. Myles

[57] ABSTRACT

A dynamoelectric machine is provided with a plurality of contiguous coolant carrying passageways disposed in heat exchange relationship with one another along the surface of the machine stator. High velocity cooling air is circulated through these paths with the air in adjacent paths being forced to flow in opposite directions, thereby to afford generally uniform cooling of the stator from end-to-end thereof.

7 Claims, 5 Drawing Figures

DYNAMOELECTRIC MACHINE HAVING VENTILATING MEANS

BACKGROUND OF THE INVENTION

1. Field of the Invention

This invention relates generally to dynamoelectric machines and more particularly to an improved ventilating means for such machines.

2. Description of the Prior Art

Dynamoelectric machines typically comprise a housing supporting an electromagnetic core section including a rigidly mounted stator and a rotor which is rotated either by a mechanical driving force coupled to it, or in response to an electromagnetic field induced by passage of electric current through the stator. One of the most significant problems encountered in the design of dynamoelectric machines is presented by heat dissipation considerations. Joulean heating of stator and rotor windings, combined with heat generated by hysteresis and eddy currents within magnetic portions of such members, tend to cause operating temperatures to rise as power is drawn from, or applied to, the machines. Adequate dissipation of the heat thus generated is required in order to prevent damage to the electrical insulation and to improve operating efficiencies of such machines.

These design considerations have led to the development of numerous different types of ventilation systems for dynamoelectric machines in the past. Broadly speaking, such prior art systems can be divided into four categories, i.e., single-end and double-end ventilation systems, and systems in which a coolant either passes directly over the stator, or those in which coolant is passed in heat exchange relationship with a portion of the machine housing thereby to indirectly cool the stator.

In a single-end ventilated type of machine, cooling air enters the machine at only one end thereof, then passes in a heat exchange relation along the length of the machine core and exits from the machine at its opposite end. While the cooling efficiency of such systems is enhanced by the direct contact achieved between the core and coolant, a disadvantage of these systems is that the coolant is continually heated as it passes along the core, so the core inevitably develops "hot spots" at the exhaust end of the coolant passageways.

Most double-ended ventilating systems for electric motors produce similar "hot spot" problems, for the same reasons; however, some double-end ventilated machines are known in which the bulk of cooling air entering each end of the machines from the same end while a remaining, relatively small, portion of air passes along certain ones of a plurality of widely spaced-apart passages along the core and exits from the opposite end of the machine. The overall cooling effect produced is somewhat of a hybrid effect; i.e., a double-ended ventilated machine effect, wherein the bulk of cooling air enters and exhausts from the same end of the machine (the prominent effect), and a single-ended ventilated machine effect, wherein air enters a single end and flows along the machine core in widely spaced-apart passages then exits from the machine at the opposite end thereof. While such an arrangement does serve to cool the core directly, it does not avoid the hot spot problem described above, because there is no effective heat exchange between either the air in adjacent axial cooling ducts, or through the core metal underlying the adjacent inlet and exhaust ports of those ducts. Moreover, in such prior art machines, no effective means are provided to maintain a large pressure differential between the inlet and exhaust ends, thereby to increase the velocity of cooling air flowing through the cooling ducts.

By the present invention, a double-ended ventilated dynamoelectric machine is provided wherein the aforementioned disadvantages are overcome by providing a plurality of contiguous cooling air paths disposed in a heat exchange relationship along the length of the machine core. All the cooling air entering the machine is directed in opposite directions through adjacent ones of the paths. The respective inlet and outlet ports of adjacent coolant ducts are spaced apart and air flowing therethrough is kept in paths that are approximately 90° to one another, cooling air entering the machine is not pre-heated by air exhausted from the machine. This cooling air is effective not only to cool the machine core directly, but also heat transfer is effected between oppositely flowing air in the adjacent paths, thereby to provide more nearly uniform cooling along the entire length of the core. In addition, heat flow through the core metal adjacent the respective inlet and exhaust ports serves to more uniformly cool the core and prevents the formulation of hot spots.

Therefore, an object of this invention is to provide a dynamoelectric machine with improved ventilating means that overcome disadvantages inherent in prior art ventilating systems.

A further object of this invention is to provide a ventilation system that uniformly and efficiently cools the stator of a dynamoelectric machine.

A further object of this invention is to provide a dynamoelectric machine cooling apparatus that reduces the maximum operating temperature produced along the machine core by its operating losses.

Yet another object of this invention is to provide a dynamoelectric machine cooling means in which high velocity cooling air is circulated in a controlled manner about the core, through contiguous paths, in opposite directions, so that the cooling air is continuously in heat exchange relationship with both the core and the cooling air in adjacent passageways.

SUMMARY OF THE INVENTION

In one preferred embodiment of the invention, a dynamoelectric machine comprising a housing containing a stator core supported in spaced relation with respect thereto is provided with a plurality of partitions disposed between the core and the housing in spaced-apart relation peripherally about the core and extending axially of the core to form a plurality of contiguous coolant conducting paths that are in heat exchange relationship with respect to each other. Means are provided for circulating cooling air in opposite directions through adjacent ones of the contiguous paths thereby to transfer heat between air flowing in the adjacent paths so temperature rises in the machine are minimized and made more uniform along the length of the core.

DESCRIPTION OF THE PREFERRED EMBODIMENT

Figure 1:
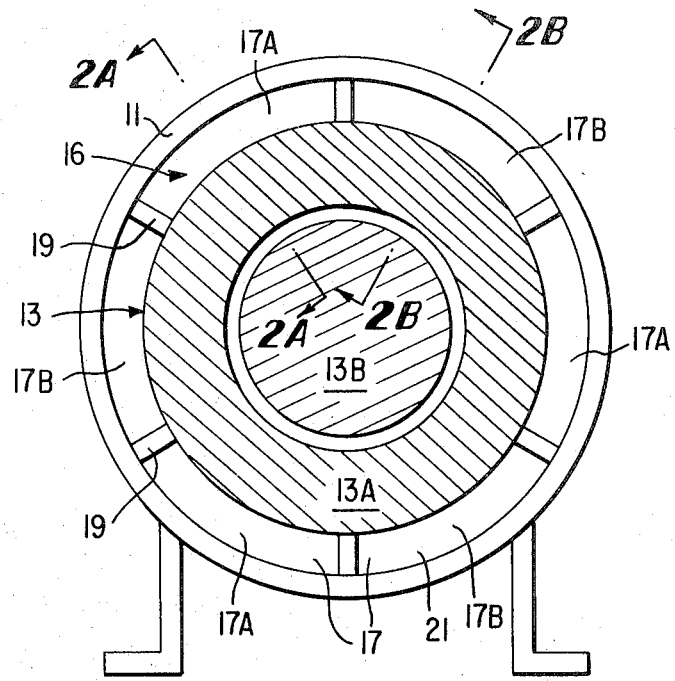
FIG. 1 shows an end view, in cross-section, of a dynamoelectric machine incorporating a ventilating means constructed in accord with the invention.
Figure 2A:
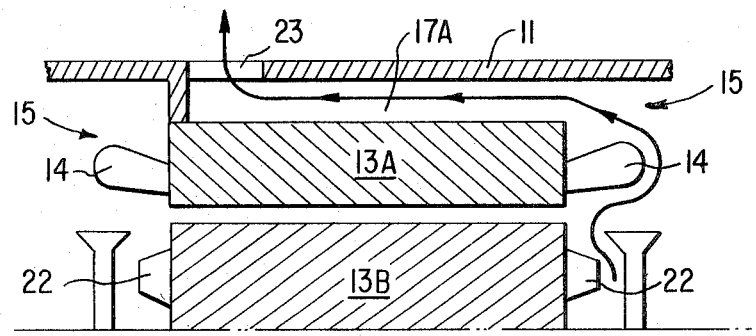
FIGS. 2A and 2B are longitudinal sections respectively along the planes 2A—2A and 2B—2B shown in FIG. 1, of portions of the dynamoelectric machine depicted in FIG. 1, indicating air flow patterns through respectively adjacent paths, in opposite directions along the stator core.
Figure 2B:
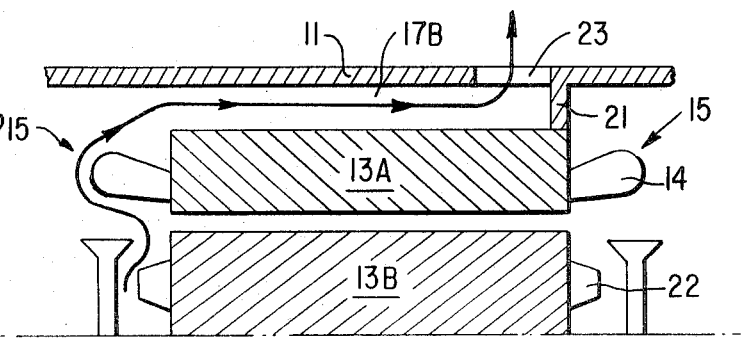

As illustrated in FIGS. 1, 2A and 2B, a dynamoelectric machine 1 is shown comprising a housing 11 within which is disposed a core 13 including a stator portion 13A and a rotor portion 13B. A plurality of stator winding end turns 14 extend from each end of the stator portion 13A into end turn cavities 15 within the housing 11. It will be appreciated that the foregoing components may take any suitable well-known form without impairing the efficiency of the ventilating means described below.

The core 13 is supported in spaced-apart relation with respect to the housing 11 and cooperates with the housing to define a ventilation region (generally identified by the number 16), through which all the cooling air entering the machine is circulated to directly contact and cool the core 13, thus effectively cooling the machine 1. To achieve this desired cooling effect, whereby the temperature rise occurring along the core 13 is minimized, the region 16 between the core and housing is divided into a plurality of axially extending contiguous paths (generally identified by the number 17, and indivdually designated by the alpha-numerics 17A and 17B), disposed in heat exchange relationship with respect to each other, by a plurality of partitions 19. The partitions 19 are formed of metal that has good thermal conductivity, and they are thin to facilitate the transmission of heat therethrough, and are disposed within the region 16 to extend between the core 13 and the housing 11 and axially along substantially the full length of the core 13. Moreover, the partitions 19 are disposed in spaced-apart relation peripherally about the core 13. Pursuant to the present invention, in the ventilating means disclosed, cooling air is caused to flow in opposite directions in adjacent ones of the contiguous paths 17A and 17B.

To achieve the desired opposite flow of coolant in adjacent paths 17A and 17B, as illustrated in FIGS. 2A and 2B, blocking members, or seal plates, 21 are mounted in any suitable manner, such as by welding, at one of the ends of the paths 17A to block the flow of air in passageways 17a at those ends. Similar blocking members, or seal plates, 21 are mounted in like manner at the opposite ends of the paths 17B to block the flow of air in passageways 17b at those ends. All the cooling air caused to enter through each end of the machine 1, by any suitable impelling means, such as the illustrated well-known arrangement of rotor mounted impellers 22, passes through the respective end turn cavities 15, past the end turns 14 therein and then at each given end of the machine, enters only alternate ones of the passageways 17, which do not have seal plates 21 blocking the passage of air into those paths from the adjacent end turn cavity 15. Thus, for the core portion shown in FIG. 2A, air enters the open end of paths 17A from the right end of the dynamoelectric machine, passes along stator 13A, and is blocked at the opposite end by a seal plate 21 so it cannot commingle with air in the other end cavity 15. Conversely, for the passageway shown in FIG. 2B, air enters the open end of a passageway 17B from the left end of the dynamoelectric machine, passes along the stator 13A, and is blocked at its opposite end by a seal plate 21. To exhaust the air which has entered the paths 17A, 17B, a plurality of exhaust openings 23 are defined by suitable wall means in the housing 11 so that each opening 23 is in communication with one of the paths, 17A or 17B, proximate its corresponding seal plate 21. It should be noted that heated air is exhausted from the side of the housing 11 at an angle of approximately 90° to the path of air entering adjacent cooling ducts; therefore there is very little pre-heating of the cooling air by air that has been exhausted from the housing.

Figure 3:
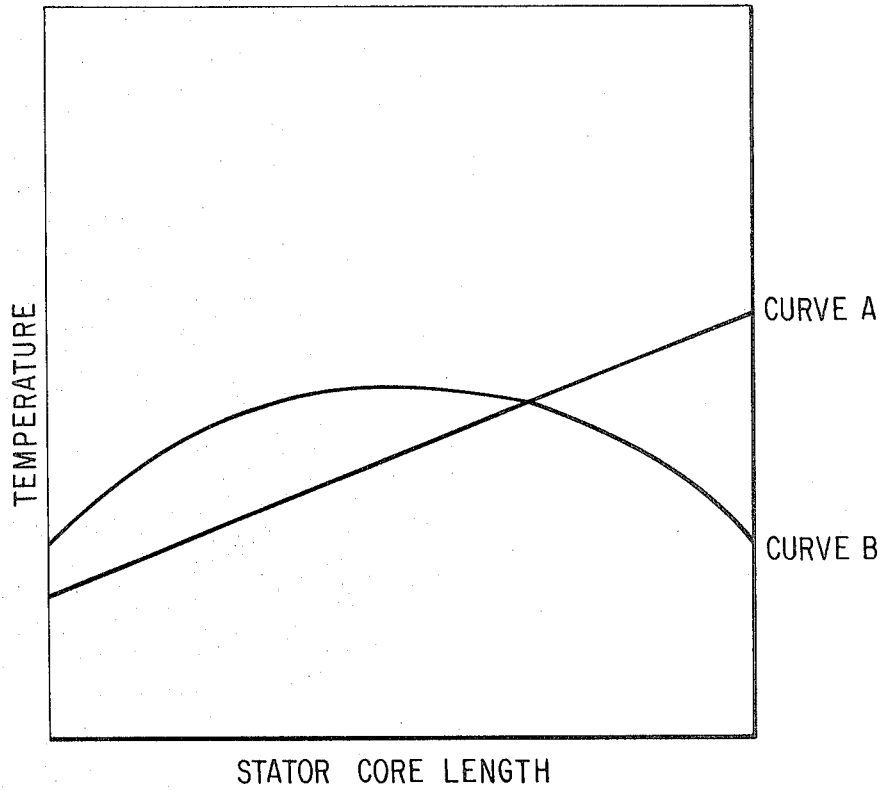
FIG. 3 illustrates a graphic representation of temperature readings taken at points along a stator core, plotted as a function of the stator core length, to show a comparison of cooling effect of the type attained in a single-end ventilated dynamoelectric machine in which cooling air enters the machine at one end and flows along the length of the core in direct heat exchange relation therewith before exhausting from the machine (Curve A) with a double-end ventilated machine embodying the present invention (Curve B).

Since the cooling air in adjacent paths 17A and 17B passes in opposite directions, and because the paths are, pursuant to the present invention, in good heat exchange relation with respect to each other, cooler air at the entrance end of one path has a cooling effect on the heated air near the exhaust end of an adjacent path so that the net effect is reduction of the maximum operating temperatures of the core 13. This effect is best illustrated by the graph shown in FIG. 3 where Curve A represents the temperature rise that will occur in a typical prior art type of single-end ventilation systems, wherein all the cooling air enters a single-end of a machine and flows along the core for its full length. Since heat is not removed from the coolant until it reaches the exhaust end of the system, the air temperature rises steadily, and the core develops hot spots at exhaust end of the cooling passageways. Curve B depicts the temperature of a core in a dynamolelectric machine incorporating a double-end ventilation means in accordance with a preferred embodiment of this invention. As shown, the temperature of the core is relatively low at the ends of the core and reaches a maximum at approximately its midpoint. It will also be noted that the maximum temperature attained by the core is less than it would be if a single-ended cooling system of the type illustrated by Curve A were used to cool the machine; or if a double-ended cooling system of the types known in the prior art, in which a heat exchange relationship is not achieved between the streams of coolant flowing from opposite ends of the machine.

Figure 4:
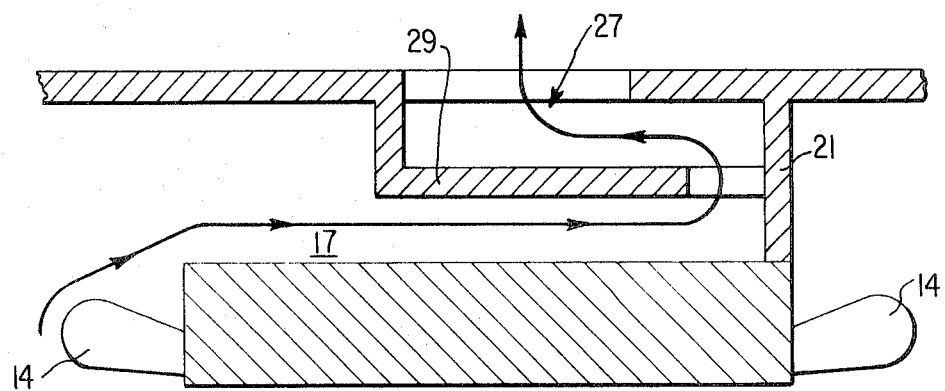
FIG. 4 illustrates an alternative embodiment of the invention shown in FIGS. 1, 2A and 2B. In this second embodiment, a baffle is employed to direct cooling air along each coolant conducting path to a given one of a plurality of elongated exhaust openings that communicate respectively with each path and are centrally located on the dynamoelectric machine housing.

Now that the novel structure and function of the preferred embodiment has been described, reference may be made to FIG. 4 which illustrates another embodiment of the invention. It should be understood that this embodiment will be described in relation to a dynamoelectric machine such as that illustrated in FIGS. 1, 2A and 2B, so like reference numerals will be used to identify parts that perform the same functions as those afforded by similar parts in the preferred embodiment. Thus, in the alternative embodiment described with reference to FIG. 4, a plurality of elongated exhaust openings are defined by suitable wall means in a machine housing 11, respectively disposed approximately centrally of a core structure 13 (stator 13A) in the housing wall of each coolant passageway. One such opening 27 is shown in FIG. 4. To insure that cooling air entering each of the paths 17 will flow along the length of the paths in optimum contact with the core structure, before exhausting from the machine 1, baffles 29 are mounted in each of the passageways 17. As shown in relation to the passageway 17B' in FIG. 4, these baffles are supported from the housing by a weld or other suitable means and are formed to extend parallel to the housing 11 in spaced relation to the respective overlying, elongated opening 27. The baffles 29 may take various suitable forms in addition to the generally L-shaped metal plate baffle member 29 shown in FIG. 4; however, it is preferred that the baffles 29 each be mounted to cause coolant to flow at a relatively high velocity, and in a turbulent fashion, adjacent the exhaust end of stator 13a, relative to the slower, and smoother flow of coolant at the entrance end of passageways 17. Such an arrangement enhances heat exchange between contiguous passageways 17A and 17B, and aids in uniformly distributing heat along the length of core 13, i.e., to flatten the Curve B of FIG. 3, as desired. The end of each baffle 29 extends beyond the end of its corresponding opening 27 and is spaced from the corresponding seal plate 21 to force air to flow in heat exchange relationship against the seal plate 21. Air entering the paths 17 flows along the stator portion 13A of the core to the seal plates 21 which forces the air around the innermost end of the baffles 29 toward the respective elongated openings 27.

While I have shown and described various embodiments of my invention, it will be obvious to those skilled in the art that various modifications and improvements may be made therein without departing from the scope of the invention. For example, it will be appreciated that improved cooling performance can be attained in practicing the invention if a larger number of cooling paths, than the six illustrated in the drawings used to describe the disclosed preferred embodiment, are utilized. Of course, the economics of using many more paths should be weighed against the need for more completely eliminating hot spots at the respective exhaust ends of the cooling passageways. It is therefore intended in the appended claims to cover all such changes and modifications that fall within the true spirit and scope of my invention.

What I claim as new and desire to be secured by Letters Patent of the United States is:

1. A dynamoelectric machine comprising:
   a housing,
   a stator core supported within said housing in spaced relation with respect thereto to define a ventilation region (16) that substantially separates all of the circumference of the core from the housing,
   a plurality of partitions rigidly mounted between said core and said housing in spaced-apart relation peripherally about said core and extending axially of said core, said plurality of partitions cooperating with said housing and core to form a plurality of contiguous, separate paths through said ventilation region, in heat exchange relation with respect to each other, each of said partitions being formed of metal having good thermal conductivity and comprising a means for exchanging heat between the contiguous, separate paths, and
   means for circulating cooling air and introducing it into said paths only at the respective ends thereof, said circulating air and the means for exchanging heat being effective to transfer heat between adjacent paths due to the flow in opposite directions of cooling air through adjacent ones of said contiguous paths, thereby to uniformly distribute heat along all of said paths and to maintain the temperature of air at both ends of said paths lower than the temperature at the middle of the paths.

2. The machine of claim 1, wherein said circulating means comprise:
   a blocking member disposed in each said path to prevent airflow therepast, each of said blocking members in alternate ones of said paths being proximate one of the ends thereof and said blocking members in each of the remaining paths being proximate the other ends thereof, and
   means defining a plurality of exhaust openings in said housing, each of said exhaust openings being in communication with a respective one of said paths proximate a corresponding blocking member.

3. The machine of claim 2 wherein a plurality of exhaust openings (23) are defined by wall means in said housing, each of said exhaust openings respectively being adjacent one of said blocking members and in communication with the path blocked by said adjacent blocking member, said exhaust openings being operable to discharge air from the housing at an angle substantially perpendicular to the flow path of air entering the next adjacent cooling paths through the housing.

4. The machine of claim 2 including air impelling means mounted in operative relationship in communication with the unblocked ends of said paths to force air into said paths.

5. The machine of claim 4 wherein said exhaust openings are axially elongated and said machine for circulating air further comprises, within each said path, a baffle supported from said housing and extending parallel to said housing in spaced relation to the elongated exhaust opening overlying the path, said baffle being positioned to extend beyond said exhaust opening and being spaced from the corresponding blocking member in said path thereby to direct air entering said path along the length of said core to said elongated exhaust opening, said baffle being effective to reduce the cross-sectional area of the path in which it is mounted, adjacent the exhaust end thereof, relative to the cross-sectional area of the path at the inlet end thereof.

6. A dynamoelectric machine comprising:
   a housing,
   a stator core supported within said housing in spaced relation with respect thereto,
   a plurality of partitions mounted between said core and said housing in a spaced-apart relation peripherally about said core and extending axially of said core, said plurality of partitions cooperating with said housing and core to form a plurality of contiguous paths in heat exchange relation with respect to each other, a plurality of partitions mounted between said core and said housing in a spaced-apart relation peripherally about said core and extending axially of said core, said plurality of partitions cooperating with said housing and core to form a plurality of contiguous paths in heat exchange relation with respect to each other, a plurality of seal plates each mounted in a respective one of said paths, comprising:
- a first group of said seal plates mounted at one end of alternate ones of said paths to block air movement therepast and
- a second group of said seal plates mounted at the ends of the remaining paths opposite to said one end to block air movement therepast, means defining a plurality of exhaust openings in said housing in communication with a respective one of said paths proximate a corresponding seal plate, air driving means in communication with the unblocked ends of said paths to drive air along said paths and out through said exhaust openings whereby air is caused to flow through contiguous paths in heat exchange relationship with air flowing in an opposite direction in adjacent paths.

7. A machine as defined in claim 6 wherein said exhaust openings are effective to exhaust air substantially radially from the machine, and wherein said air driving means are operable to drive air axially into said paths.

* * * * *